Feb. 12, 1924.
E. F. PRICE
MANGER FOR DAIRY BARNS
Filed Jan. 19, 1923
1,483,376
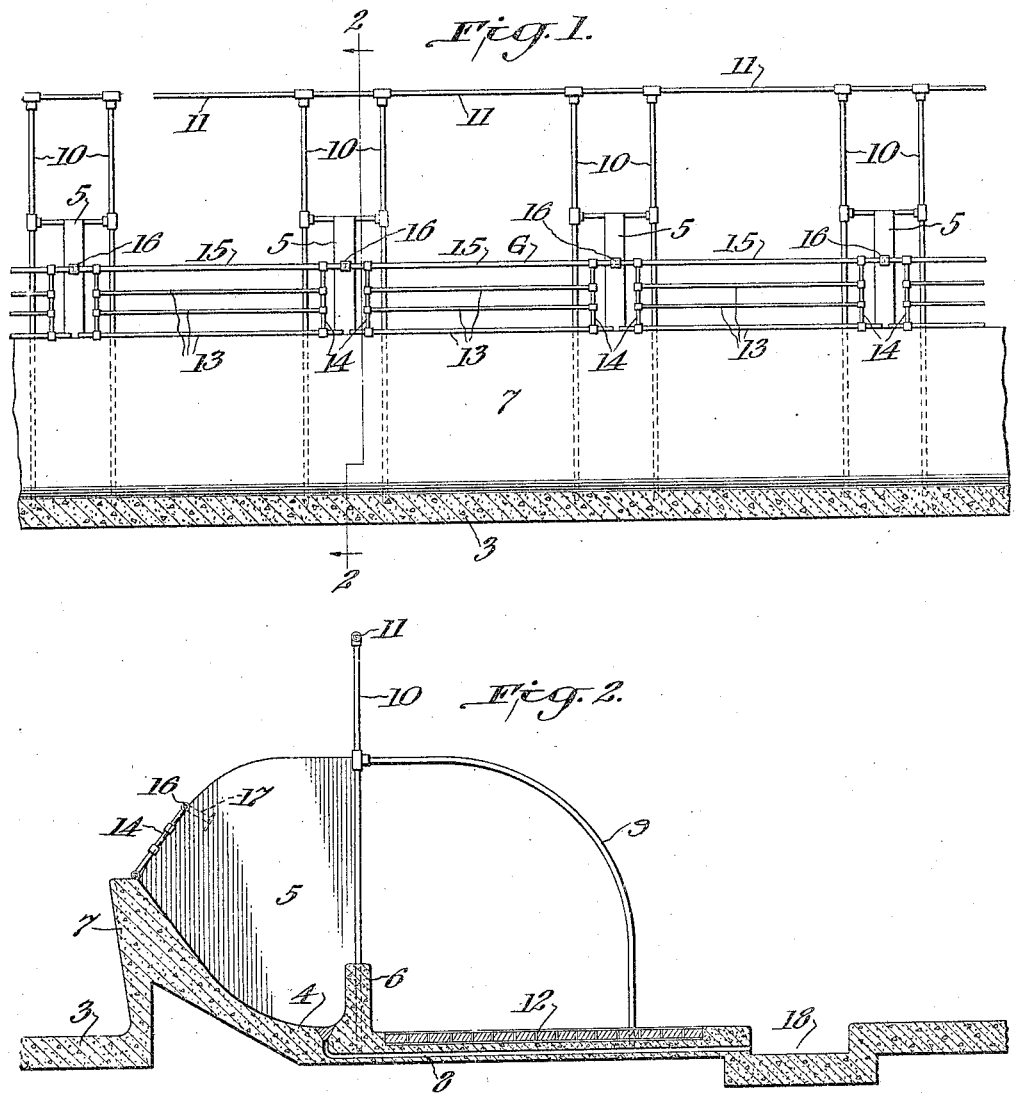

Patented Feb. 12, 1924.

1,483,376

UNITED STATES PATENT OFFICE.

EDGAR F. PRICE, OF PORT CHESTER, NEW YORK.

MANGER FOR DAIRY BARNS.

Application filed January 19, 1923. Serial No. 613,716.

*To all whom it may concern:*

Be it known that I, EDGAR F. PRICE, a citizen of the United States, residing at Port Chester, in the county of Westchester and State of New York, have invented certain new and useful Improvements in Mangers for Dairy Barns, of which the following is a specification.

This invention relates to mangers for feeding animals, particularly in dairy barns.

The objects of the invention are to improve the sanitation of dairy barns by completely preventing the mixing of the feed of individual cows, and by preventing the transportation of any source of infection from one manger to another. A further object is to prevent the wastage of feed.

In modern dairy barns the mangers are ordinarily divisions of a continuous trough, running along a row of stalls. Partitions in the trough are provided to keep separate the feed of the individual cows. These partitions are removable and the managers are cleaned by flushing the trough from end to end after removing the partitions. By this procedure it is possible to infect the mangers of healthy cows by washing pathogenic bacteria along the trough; one cow suffering from a communicable disease renders every other cow feeding from the same manger trough liable to infection. I avoid this source of danger by providing permanent water-tight partitions between the individual mangers.

The back-wall of a manger-trough of present constructions is of such height that a cow frequently noses or tosses a portion of her feed into the alley behind the mangers. It will be understood that the bottom of the manger is usually sloped to cause the feed to roll down within easy reach of the cow, and that the sloping bottom makes it rather easy for the cow to push feed out of the manger. The feed so ejected from the manger is either wasted, or collected and redistributed. In the latter case the possibility of spreading disease will be apparent.

It is undesirable to prevent the pushing of feed over the back wall of the manger by making this wall higher, as light and air are thereby excluded from the stall to some extent, and access to the manger for cleaning it or introducing feed is rendered difficult. A higher wall is particularly undesirable if non-removable partitions are used between the mangers. In such a construction, maximum accessibility is necessary because there is additional surface to be cleaned.

In accordance with my invention, the back wall of the manger is extended to a height sufficient to prevent the ejection of feed, and the extension is made removable so that it does not interfere with the cleaning of the manger or the introduction of feed. The back-wall extension is preferably of such construction that it does not exclude light and air, and may be hinged so as to swing quickly either into or out of its normal position.

For a better understanding of the invention, reference is had to the accompanying drawing, wherein:

Fig. 1 is a view of a portion of a row of stalls and mangers viewed from the back of the mangers, and Fig. 2 is a section along line 2—2 of Fig. 1.

In the drawings, the floor of the barn is indicated at 3. Such floors are almost invariably of concrete, and the bottom 4, the side walls 5, the front wall 6 and the back wall 7 of the manger may be, with the floor, of monolithic construction. A conduit 8 draining each manger to the gutter 18 should be provided.

The stalls are defined by the curved members 9 and the standards 10, the latter being joined by the horizontal members 11 which brace the standards and serve to hold the stanchions. 12 indicates an auxiliary floor of heat-insulating material on which the cows stand.

The side- or partition-walls 5 are of sufficient height to prevent feed from being tossed over them, but the back wall 7 is much lower. Above the back wall, and serving as an extension thereof, is the guard generally indicated at G. This guard may consist of parallel horizontal bars or pipes 13 spaced a few inches apart and secured at their ends to the swinging members 14. The latter are rigidly attached to a horizontal member 15, the ends of which rest in brackets 16 attached to the manger divisions 5 by anchors 17. Brackets 16 serve as bearings in which member 15 revolves freely. The member 15 may extend across several stalls in which case a corresponding number of the guards will swing together, or 15 may extend across one stall only and abut at either end against corresponding members for the adjacent stalls. In this latter arrangement, which is preferred, the guards are separately operable.

When access to a manger is desired for the purpose of cleaning the latter, or introducing feed, its guard is swung upward and backward until it rests against the oblique fronts of the partitions 5. In this position, the guard is self-sustaining. To replace the guard, the operation is reversed, and gravity holds the guard in its normal position.

Having now described my invention, I claim:

1. A manger having a wall comprising separable lower and upper portions, said upper portion being arranged to swing from its normal position about a horizontal axis until it abuts against and is supported by a fixed member attached to the manger.

2. The invention according to claim 1 in which the swinging wall is supported by fixed members in its normal position, and swings to a position wherein its normally lower edge is higher than the axis upon which it swings.

In testimony whereof, I affix my signature.

EDGAR F. PRICE.